(12) United States Patent
Meizlish et al.

(10) Patent No.: US 11,660,786 B2
(45) Date of Patent: May 30, 2023

(54) LEVELER TABLE

(71) Applicant: Marcy Enterprises, Inc., Columbus, OH (US)

(72) Inventors: Steven R Meizlish, Bexley, OH (US); David W Robinson, Worthington, OH (US)

( * ) Notice: Subject to any disclaimer, the term of this patent is extended or adjusted under 35 U.S.C. 154(b) by 0 days.

(21) Appl. No.: 17/462,895

(22) Filed: Aug. 31, 2021

(65) Prior Publication Data

US 2022/0063142 A1 Mar. 3, 2022

Related U.S. Application Data

(60) Provisional application No. 63/073,273, filed on Sep. 1, 2020.

(51) Int. Cl.
*B29C 33/30* (2006.01)
*B29C 39/26* (2006.01)
*B25B 11/02* (2006.01)

(52) U.S. Cl.
CPC ............ *B29C 33/308* (2013.01); *B25B 11/02* (2013.01); *B29C 39/26* (2013.01)

(58) Field of Classification Search
CPC ........... B25B 11/00; B25B 11/02; B23Q 3/00; B23Q 3/107
See application file for complete search history.

(56) References Cited

U.S. PATENT DOCUMENTS

| 3,185,423 | A  | * | 5/1965 | Jones, III | F16M 7/00 108/150 |
| 2009/0261217 | A1 | * | 10/2009 | Clark | B23Q 1/25 248/188.4 |
| 2014/0157699 | A1 | * | 6/2014 | Moeller | E04F 13/23 52/235 |
| 2018/0355851 | A1 | * | 12/2018 | Brohm | F03D 13/22 |
| 2022/0034655 | A1 | * | 2/2022 | Nishita | F16M 11/242 |
| 2022/0063142 | A1 | * | 3/2022 | Meizlish | B29C 33/305 |

\* cited by examiner

*Primary Examiner* — Lee D Wilson
(74) *Attorney, Agent, or Firm* — Wood Herron & Evans LLP

(57) ABSTRACT

A leveler table includes a plate with a flat top work surface that is level in all planes, by locating a circular level recessed within the center of the plate, so that the level indicator of the circular level is in horizontal alignment with the top work surface. By locating the circular level in the middle of the plate, at the same horizontal level as the work surface, this leveler table provides accuracy and repeatability for use of the flat top work surface in manufacturing steps, particularly the forming of parts where repeatability is necessary, such as the in situ forming of an automotive windshield sensor pad in an open ended package supported on the flat top surface.

6 Claims, 4 Drawing Sheets

LEVELER TABLE

FIELD OF THE INVENTION

The present application relates to a leveler table, and more particularly to a leveler table combined with a circular level, to enable the top surface of the leveler table to achieve a level condition with respect to both the x and the y coordinates.

BACKGROUND OF THE INVENTION

Some manufacturing steps must be performed on a table surface or work surface that is level, with "level" in this context meaning that the surface is level with respect to both the X coordinate and the Y coordinate, also referred to herein as the "x axis" and the "y axis." To achieve this goal, it is also known to use a circular level that is secured to or resting on the work surface, to show more than one axis.

Leveler tables are available which enable a user to adjust the level of the top surface of the table relative to an underlying support surface. Typically, a leveler table includes a platform or plate with three spaced screws threadably extended therethrough. The bottoms of the screws contact an underlying support. By rotatably adjusting the positions of the screws relative to the platform, the user is able to vary the vertical position of the top surface of the platform, to eventually put the top surface in a horizontally level orientation. With one or more levels, or a circular level located on the platform, the location of the bubble within the boundary lines will show the user that the screws have been suitably adjusted to place the top surface of the table at a horizontally "level" position.

When using a leveler table of this type to manufacture products, it is important that the user achieve a high degree of repeatability with respect to the level orientation of the top work surface. Otherwise, there will be undesired variation in the quality of the products, particularly with respect to the shape of the product.

One manufacturing procedure that requires a level top work surface is that of producing cured sensor pads used for windshields in the automotive windshield aftermarket. For example, applicant, Marcy Enterprises, Inc. ("Marcy"), markets a product called "Quick Cure Rain Sensor Gel" which is shown and described on its website, at www.marcyadhesives.com The contents of this Marcy website are expressly incorporated by reference herein, in their entirety.

When forming such a sensor pad, a user fills (by pouring) the sensor pad material into a mold or casting, in liquid form. The sensor material thereafter cures to form a pad having the same shape as the shape of the mold or casting into which it has been poured. For such automotive windshield sensor pads, it is important that the completed and cured sensor pads be of identical shape, including uniform thickness, and consistent in appearance and quality. In practical terms, this means that when the sensor pad material is poured into the mold in liquid form, the mold must be resting on a work surface that is completely level with respect to both the x axis and the y axis. And this must be true for every sensor pad that is made. If the work surface is not level then the resulting sensor pad will likely not work for its intended purpose, or at least the resulting sensor pad will be at a risk of not performing reliably and consistently.

It is one object of the present invention to achieve a high degree of consistency, quality, and repeatability in the production of windshield sensor pads.

It is another object of the present invention to achieve the above-stated qualities in a relatively efficient and cost-effective manner.

SUMMARY OF THE INVENTION

The present invention achieves these above-stated objectives by recessing a circular level within a center portion of a leveler table, preferably in an interference fit from below, such that the top surface of the circular level resides in the same horizontal plane as the top surface of the leveler plate, which is the work surface used for manufacturing products. Three spaced screws threadably extend through the plate, at spaced positions, to enable a user to adjust the screws relative to the plate, thereby to place the top surface of the plate in a level condition.

With the circular level mounted in the center of the plate, and preferably with a square plate, the user knows that the work surface is level because the circular level is right in the center of the plate, where it is relatively easy to see because of its central location. This assures repeatability in making products on the work surface. Moreover, with the circular level recessed within the top of the plate, preferably with an interference fit, within a circular hole of predetermined diameter formed in the plate, the location of the circular level assures accuracy with respect to the top work surface. This leveler table provides a true level work surface that is repeatable for the user when manufacturing products, including automotive windshield sensor pads. This enables the user to repeatably produce sensor pads of uniform thickness.

With this leveler plate the user is able to achieve a high degree of consistency, quality, and repeatability in the production of windshield sensor pads. Moreover, with this leveler plate the user is able to achieve these objectives in a relatively efficient and cost-effective manner.

Those skilled in the art will more fully understand the specification by considering the accompanying drawings, which this specification first briefly describes and then describes in more detail.

DETAILED DESCRIPTION OF THE DRAWINGS

Figure 1:
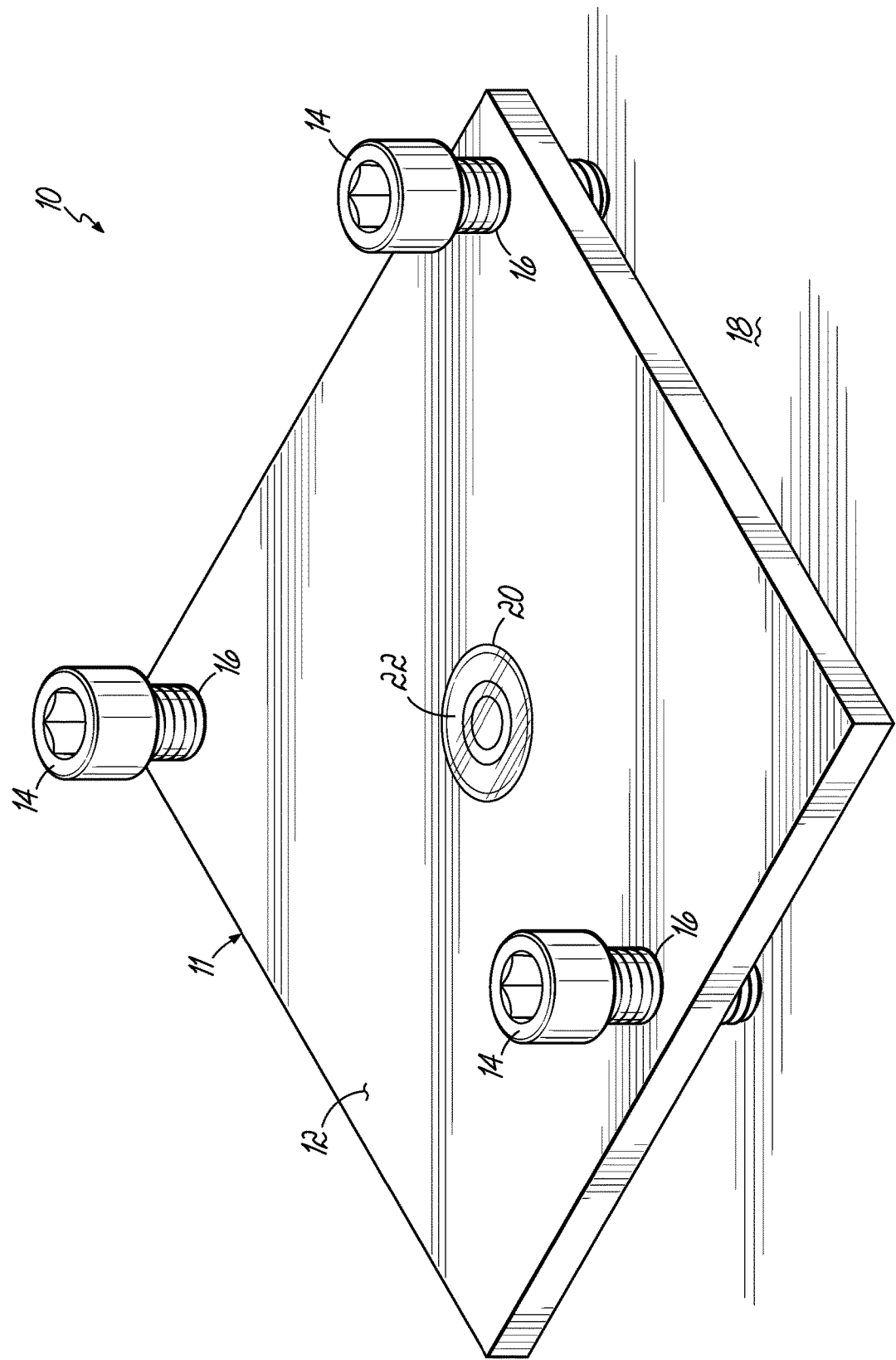
FIG. 1 is a perspective view of a leveler table according to a preferred embodiment of the invention.
Figure 2:
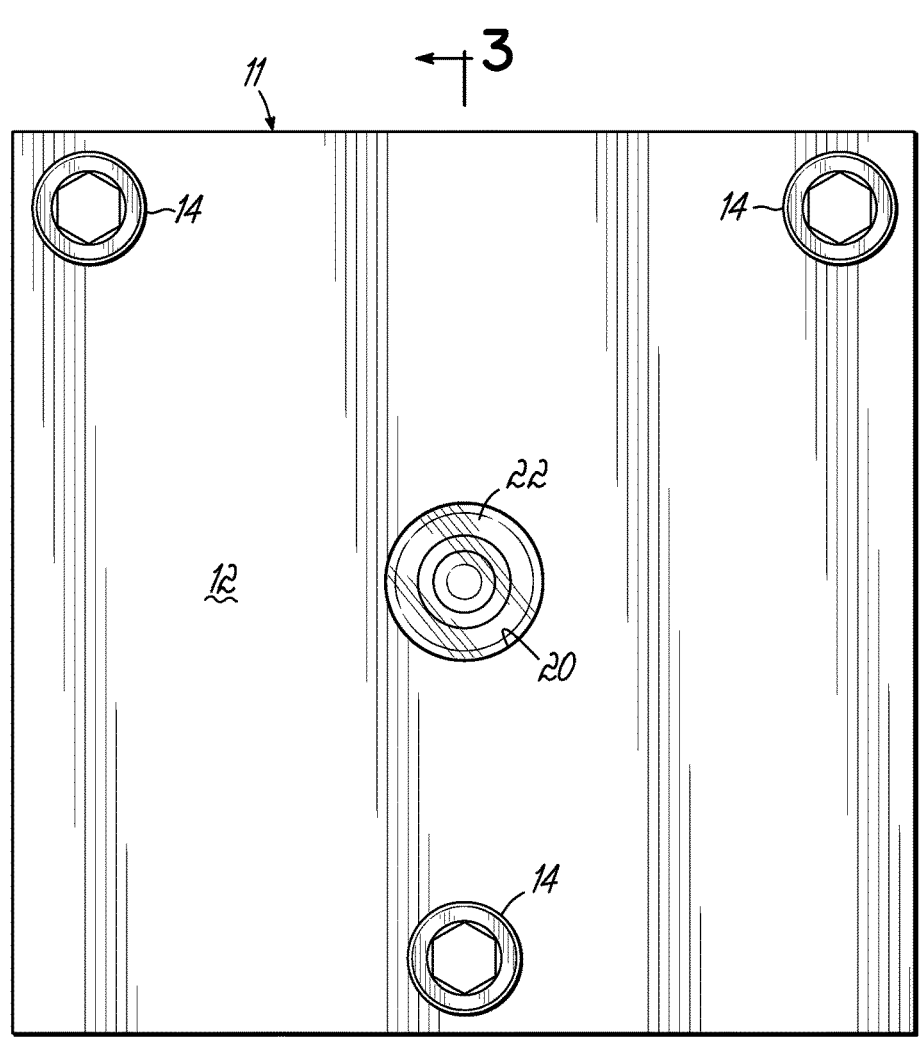
FIG. 2 is a top plan view of the leveler table shown in FIG. 1.

FIG. 1 shows a leveler table 10 according to a preferred embodiment of the invention. The leveler table 10 incudes a plate 11 having a flat top surface 12, and has three threaded screws 14 threadably extended therethrough, through three corresponding screw holes 16. The bottoms of the screws 14 rest on an underlying support 18 (shown in FIGS. 1 and 3). A center hole 20 in the middle of the plate 11 receives a circular level 22. FIG. 2 shows the relative position of these components from a top plan view.

Figure 3:
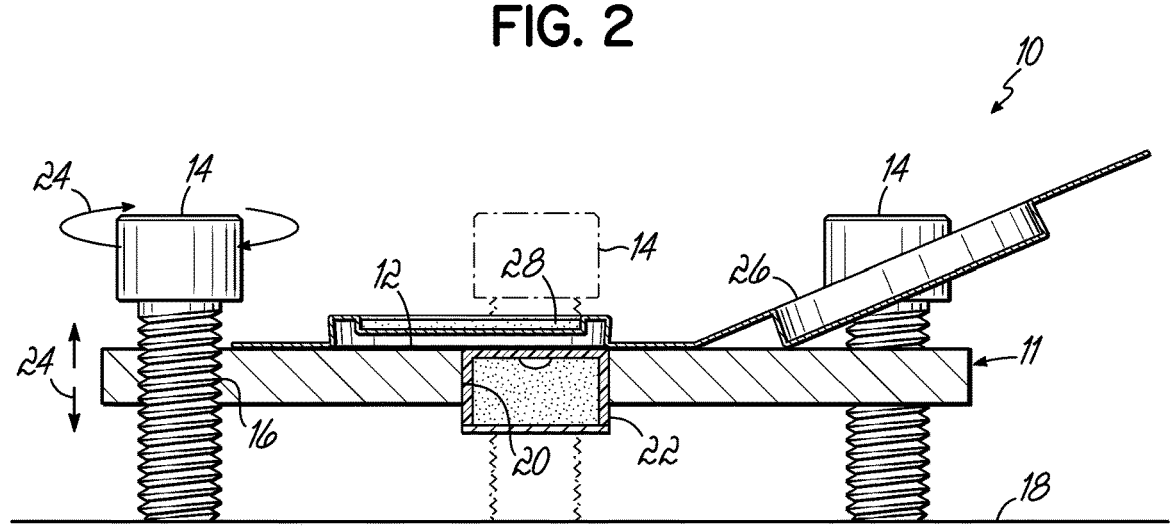
FIG. 3 is a horizontal cross-sectional view taken along lines 3-3 shown in FIG. 2, with directional arrows showing the adjustability of one of the screws, and with a package for forming an automotive windshield sensor pad resting on a top surface of the table, with the package in an open condition.

FIG. 2 also shows, via directional arrows 24, the vertical adjustability of one of the screws 14. Those skilled in the art will recognize that all three screws 14 have the same adjustable capability, to enable a user to achieve a level top surface 12, to facilitate the use of the top surface 12, for instance, in making automotive windshield sensor pads (not shown). In fact, FIG. 3 shows a package 26 for one such windshield sensor pad, the package being in an open condition. The details of a suitable package 26 are disclosed more fully in U.S. Design patent application Ser. No. 29/748,203, filed Aug. 27, 2020, and also in U.S. patent application Ser. No. 16/629,198, filed Jul. 6, 2018, each of which is expressly incorporated by reference herein, in its entirety. Essentially, the package 26 is a mold for receiving the pad material 28 in liquid form, prior to curing.

Figure 4:
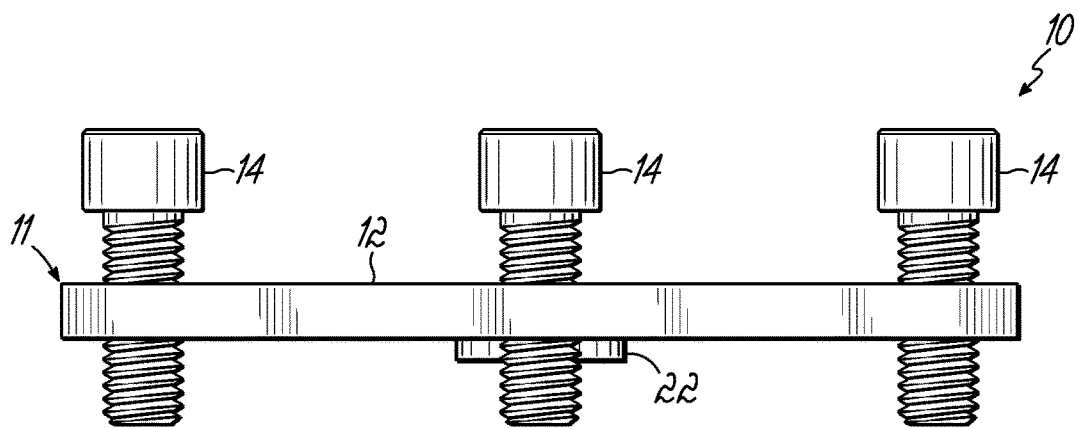
FIGS. 4 and 5 show a horizontal view of the leveler table shown in FIG. 1, from the front and from the rear, respectively.
Figure 5:
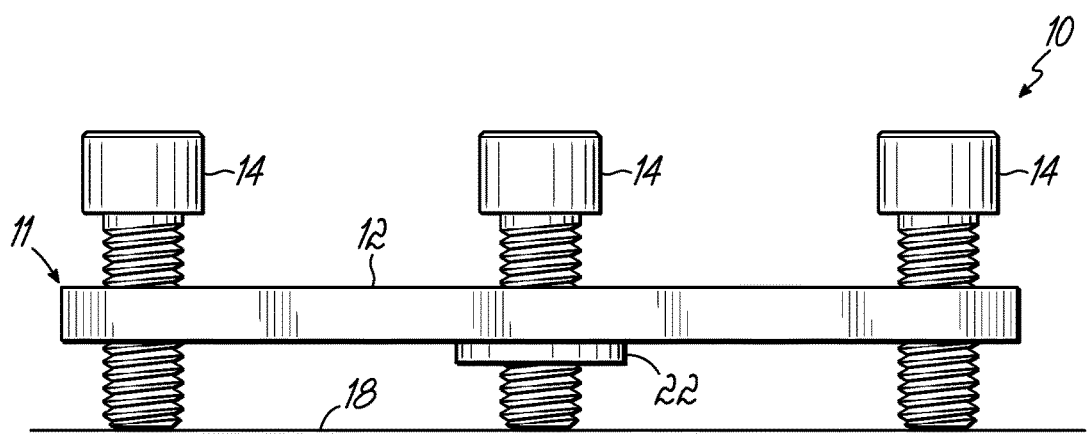
Figure 6:
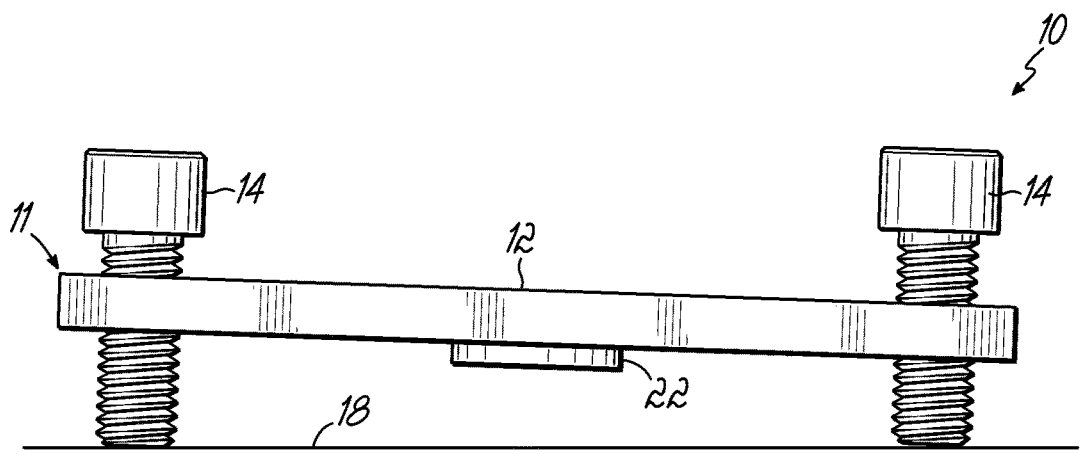
FIG. 6 is a horizontal view that shows the leveler table in an unlevel condition, due to the need to adjust one or more of the screws to thereby achieve a level top surface.

FIGS. 4 and 5 show front and back horizontal views of the leveler table 10 FIG. 6 shows the leveler table 10 in a tilted condition, so that it needs to be adjusted.

Figure 7:
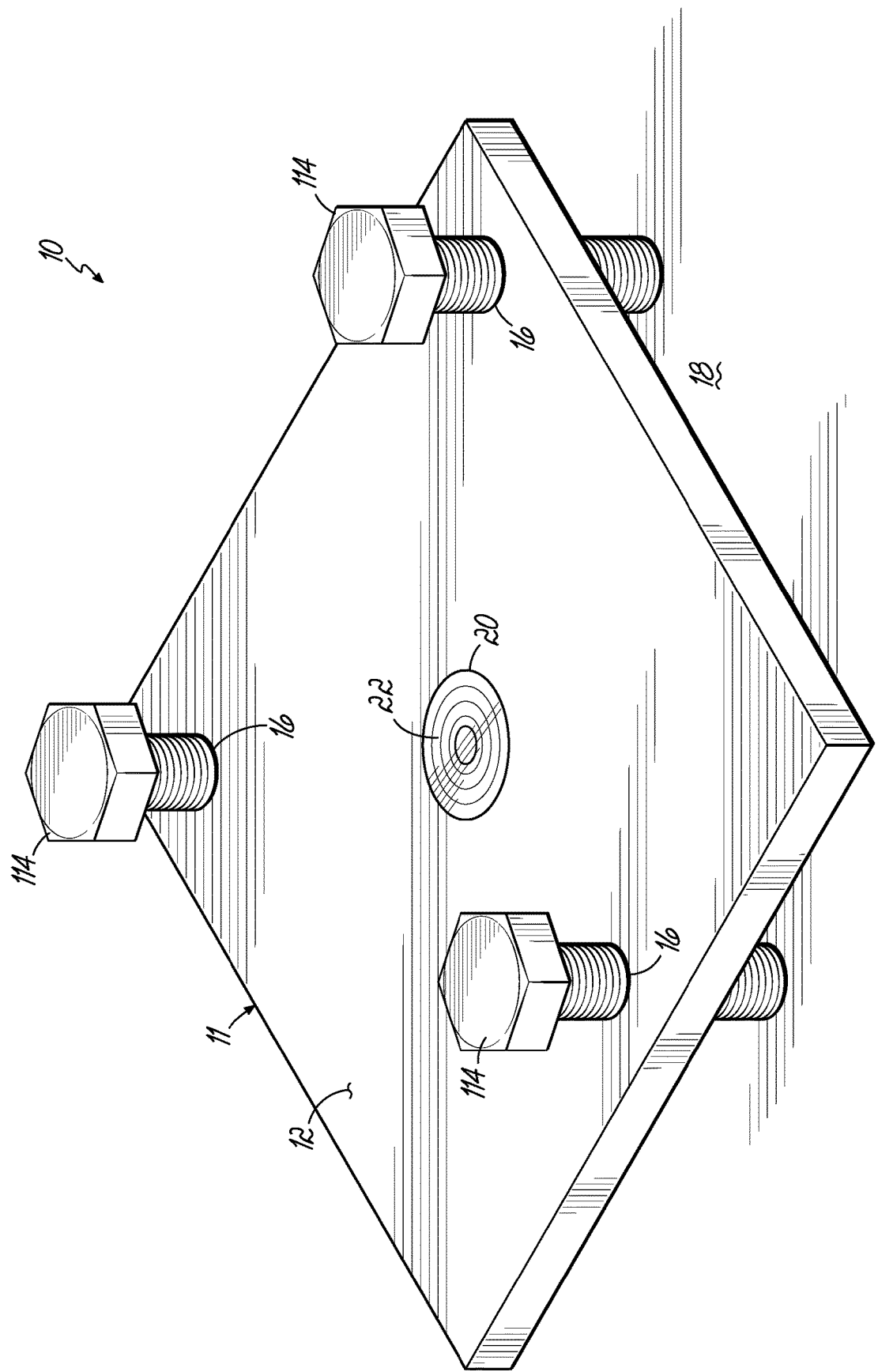
FIG. 7 shows a variation on the embodiment of the leveler table shown in FIG. 1, with different screw head types.

According to the embodiment of the invention shown in the Figures, the leveler table 10 is formed from a square aluminum plate with length and width dimensions of 4.5", and a uniform thickness of 0.25". Those skilled in the art will recognize that other dimensions would also work. Further, in this embodiment the plate 11 has a hole 20 formed in the middle thereof, with the diameter of the hole 20 preferably being 20 mm. According to this embodiment the circular level 22 preferably also has a dimension of 20 mm (diameter) by 9 mm (depth). Applicant has used a commercially available "bullseye" bubble level for this particular leveler table. Further, applicant has used three eighth by one inch knurled socket head cap screws 114 threadably extended through the plate 11 at the spaced locations of the screw holes 16, as shown in FIG. 7.

This specification describes and shows one currently preferred embodiment of the invention, but those skilled in the art will recognize that this invention is suitable for reasonable modification, and that the disclosed invention is therefore not limited to the specific examples shown and described herein. Thus, the Figures and this description should be considered exemplary, not limiting, and the accompanying claims define the scope of the present invention.

We claim:

1. A leveler table comprising:
   a plate having a flat top surface and three spaced threaded holes extending therethrough;
   at least three screws, one for each hole in the plate, each screw adapted to be rotatably adjusted relative to the plate so as to adjust the flat top surface thereof relative to an underlying support surface that engages the bottoms of the screws; and
   a circular level mounted in the middle of the flat top surface of the plate, such that an upper surface of the circular level resides in the same horizontal plane as the flat top surface of the plate, thereby to enable a user to readily see the orientation of the table top surface while adjusting one or more of the screws, to assure a horizontal work surface.

2. The leveler table of claim 1 wherein the plate comprises aluminum of square dimensions, preferably 4.5 inches by 4.5 inches, with a uniform thickness of 0.25 inches.

3. The leveler table of claim 1 wherein the plate includes a center hole in the middle of the top surface thereof, the circular level located within the center hole.

4. The leveler table of claim 3 wherein the circular level resides within the center hole via an interference fit.

5. The leveler table of claim 3 wherein the center hole has a diameter of twenty millimeters.

6. The leveler table of claim 1 wherein each of the screws is a three-eighth by one inch knurled socket head cap screw.

* * * * *